US012695864B2

(12) United States Patent
Zhao et al.

(10) Patent No.: US 12,695,864 B2
(45) Date of Patent: Jul. 28, 2026

(54) METHOD, APPARATUS, AND MEDIUM FOR VIDEO PROCESSING

(71) Applicants: Beijing Bytedance Network Technology Co., Ltd., Beijing (CN); Bytedance Inc., Los Angeles, CA (US)

(72) Inventors: Lei Zhao, Beijing (CN); Kai Zhang, Los Angeles, CA (US); Li Zhang, Los Angeles, CA (US)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 126 days.

(21) Appl. No.: 18/622,618

(22) Filed: Mar. 29, 2024

(65) Prior Publication Data

US 2024/0244187 A1    Jul. 18, 2024

Related U.S. Application Data

(63) Continuation of application No. PCT/CN2022/122325, filed on Sep. 28, 2022.

(30) Foreign Application Priority Data

Sep. 28, 2022    (WO) ................ PCT/CN2022/122325

(51) Int. Cl.
| | |
|---|---|
| *H04N 19/00* | (2014.01) |
| *H04N 19/105* | (2014.01) |
| *H04N 19/159* | (2014.01) |
| *H04N 19/176* | (2014.01) |
| *H04N 19/51* | (2014.01) |

(52) U.S. Cl.
CPC ......... *H04N 19/105* (2014.11); *H04N 19/159* (2014.11); *H04N 19/176* (2014.11); *H04N 19/51* (2014.11)

(58) Field of Classification Search
CPC ...................................................... H04N 19/00
See application file for complete search history.

(56) References Cited

U.S. PATENT DOCUMENTS

| | | |
|---|---|---|
| 2018/0041769 A1 | 2/2018 | Chuang et al. |
| 2020/0195959 A1 | 6/2020 | Zhang et al. |
| 2020/0236398 A1 | 7/2020 | Esenlik et al. |
| 2021/0120262 A1* | 4/2021 | Chen .................... H04N 19/176 |

FOREIGN PATENT DOCUMENTS

WO    2020/007261 A1    1/2020

OTHER PUBLICATIONS

International Search Report and Written Opinion received for PCT Patent Application No. PCT/CN2022/122325, mailed on Dec. 15, 2022, 6 pages.

* cited by examiner

*Primary Examiner* — Maryam A Nasri

(74) *Attorney, Agent, or Firm* — Astute IP Law Group

(57) ABSTRACT

Embodiments of the present disclosure provide a solution for video processing. A method for video processing is proposed. The method comprises: determining, during a conversion between a target video block of a video and a bitstream of the video, a reference template for the target video block without involving an interpolation process; and performing the conversion based on the reference template. Compared with the conventional solution, the proposed method can advantageously improve the template matching based video coding and thus improve the coding effectiveness and coding efficiency.

19 Claims, 10 Drawing Sheets

400

500

1000

1002

DETERMINE, DURING A CONVERSION BETWEEN A TARGET VIDEO BLOCK OF A VIDEO AND A BITSTREAM OF THE VIDEO, A REFERENCE TEMPLATE FOR THE TARGET VIDEO BLOCK WITHOUT INVOLVING AN INTERPOLATION PROCESS

1004

PERFORM THE CONVERSION BASED ON THE REFERENCE TEMPLATE

1100 —

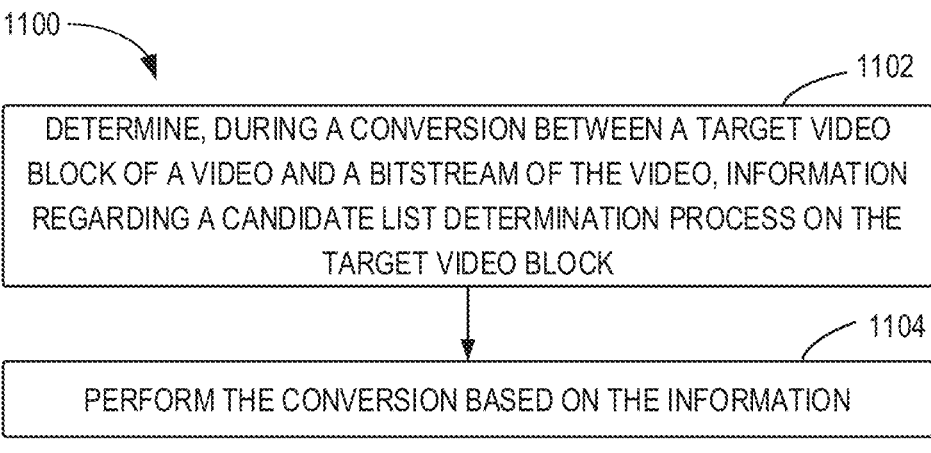

1102

DETERMINE, DURING A CONVERSION BETWEEN A TARGET VIDEO BLOCK OF A VIDEO AND A BITSTREAM OF THE VIDEO, INFORMATION REGARDING A CANDIDATE LIST DETERMINATION PROCESS ON THE TARGET VIDEO BLOCK

1104

PERFORM THE CONVERSION BASED ON THE INFORMATION

DETERMINE, DURING A CONVERSION BETWEEN A TARGET VIDEO BLOCK OF A VIDEO AND A BITSTREAM OF THE VIDEO, INFORMATION ASSOCIATED WITH A MERGE CANDIDATE OF THE TARGET VIDEO BLOCK BY A FIRST CODING TOOL

1204

APPLY, ON THE TARGET VIDEO BLOCK, A SECOND CODING TOOL BY USING THE INFORMATION

1206

PERFORM THE CONVERSION BASED ON THE APPLYING

Fig. 12

METHOD, APPARATUS, AND MEDIUM FOR VIDEO PROCESSING

CROSS-REFERENCE TO RELATED APPLICATIONS

This application is a continuation of International Application No. PCT/CN2022/122325, filed on Sep. 28, 2022, which claims the benefit of International Application No. PCT/CN2021/121957, filed on Sep. 29, 2021. The entire contents of these applications are hereby incorporated by reference in their entireties.

FIELD

Embodiments of the present disclosure relates generally to video coding techniques, and more particularly, to template matching based video coding enhancement.

BACKGROUND

In nowadays, digital video capabilities are being applied in various aspects of peoples' lives. Multiple types of video compression technologies, such as MPEG-2, MPEG-4, ITU-TH.263, ITU-TH.264/MPEG-4 Part 10 Advanced Video Coding (AVC), ITU-TH.265 high efficiency video coding (HEVC) standard, versatile video coding (VVC) standard, have been proposed for video encoding/decoding. However, coding efficiency of conventional video coding techniques is generally very low, which is undesirable.

SUMMARY

Embodiments of the present disclosure provide a solution for video processing.

In a first aspect, a method for video processing is proposed. The method comprises: determining, during a conversion between a target video block of a video and a bitstream of the video, a reference template for the target video block without involving an interpolation process; and performing the conversion based on the reference template.

The method in accordance with the first aspect of the present disclosure employs a reference template derivation process in which the interpolation process is replaced by different ways. Compared with the conventional solution, the proposed method can improve the coding efficiency of the reference template derivation, and thus improve the coding effectiveness and coding efficiency.

In a second aspect, another method for video processing is proposed. The method comprises: determining, during a conversion between a target video block of a video and a bitstream of the video, information regarding a candidate list determination process on the target video block based on at least one of: a candidate number threshold, or a number of available candidates absent from a candidate list; and performing the conversion based on the information.

The method in accordance with the second aspect of the present disclosure determines information regarding the candidate determination process based on candidate number threshold and/or available candidate number, which makes it possible to perform the candidate determination process based on the determined information. In this way, the candidate determination process can be improved, and thus the coding effectiveness and coding efficiency can be improved.

In a third aspect, another method for video processing is proposed. The method comprises: determining, during a conversion between a target video block of a video and a bitstream of the video, information associated with a merge candidate of the target video block by a first coding tool; applying, on the target video block, a second coding tool different from the first coding tool by using the information; and performing the conversion based on the applying.

The method in accordance with the third aspect of the present disclosure reuses, by a second coding tool, information determined by a first coding tool. By reusing the information determined by the first coding tool, the second coding tool does not need to perform repeat calculation to determine the information. In this way, the computation complexity can be reduced, and thus the coding effectiveness and coding efficiency can be improved.

In a fourth aspect, an apparatus for processing video data is proposed. The apparatus for processing video data comprises a processor and a non-transitory memory with instructions thereon, wherein the instructions upon execution by the processor, cause the processor to perform a method in accordance with the first, second or third aspect of the present disclosure.

In a fifth aspect, a non-transitory computer-readable storage medium is proposed. The non-transitory computer-readable storage medium stores instructions that cause a processor to perform a method in accordance with the first, second or third aspect of the present disclosure.

In a sixth aspect, a non-transitory computer-readable recording medium is proposed. The non-transitory computer-readable recording medium stores a bitstream of a video which is generated by a method performed by a video processing apparatus, wherein the method comprises: determining a reference template for a target video block of the video without involving an interpolation process; and generating the bitstream based on the reference template.

In a seventh aspect, a method for storing a bitstream of a video is proposed. The method comprises: determining a reference template for a target video block of the video without involving an interpolation process; and generating the bitstream based on the reference template; and storing the bitstream in a non-transitory computer-readable recording medium.

In an eighth aspect, another non-transitory computer-readable recording medium is proposed. The non-transitory computer-readable recording medium stores a bitstream of a video which is generated by a method performed by a video processing apparatus, wherein the method comprises: determining information regarding a candidate list determination process on a target video block of the video based on at least one of a candidate number threshold, or a number of available candidates absent from a candidate list; and generating the bitstream based on the information.

In a ninth aspect, another method for storing a bitstream of a video is proposed. The method comprises: determining information regarding a candidate list determination process on a target video block of the video based on at least one of a candidate number threshold, or a number of available candidates absent from a candidate list; generating the bitstream based on the information; and storing the bitstream in a non-transitory computer-readable recording medium.

In a tenth aspect, another non-transitory computer-readable recording medium is proposed. The non-transitory computer-readable recording medium stores a bitstream of a video which is generated by a method performed by a video processing apparatus, wherein the method comprises: determining, by a first coding tool, information associated with a merge candidate of a target video block of the video; applying, on the target video block, a second coding tool different from the first coding tool by using the information; and generating the bitstream based on the applying.

In an eleventh aspect, another method for storing a bitstream of a video is proposed. The method comprises: determining, by a first coding tool, information associated with a merge candidate of a target video block of the video; applying, on the target video block, a second coding tool different from the first coding tool by using the information; generating the bitstream based on the applying; and storing the bitstream in a non-transitory computer-readable recording medium.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

FIG. 11 illustrates another flowchart of a method for video processing in accordance with some embodiments of the present disclosure;

FIG. 12 illustrates another flowchart of a method for video processing in accordance with some embodiments of the present disclosure.

Throughout the drawings, the same or similar reference numerals usually refer to the same or similar elements.

DETAILED DESCRIPTION

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Example Environment

Figure 1:
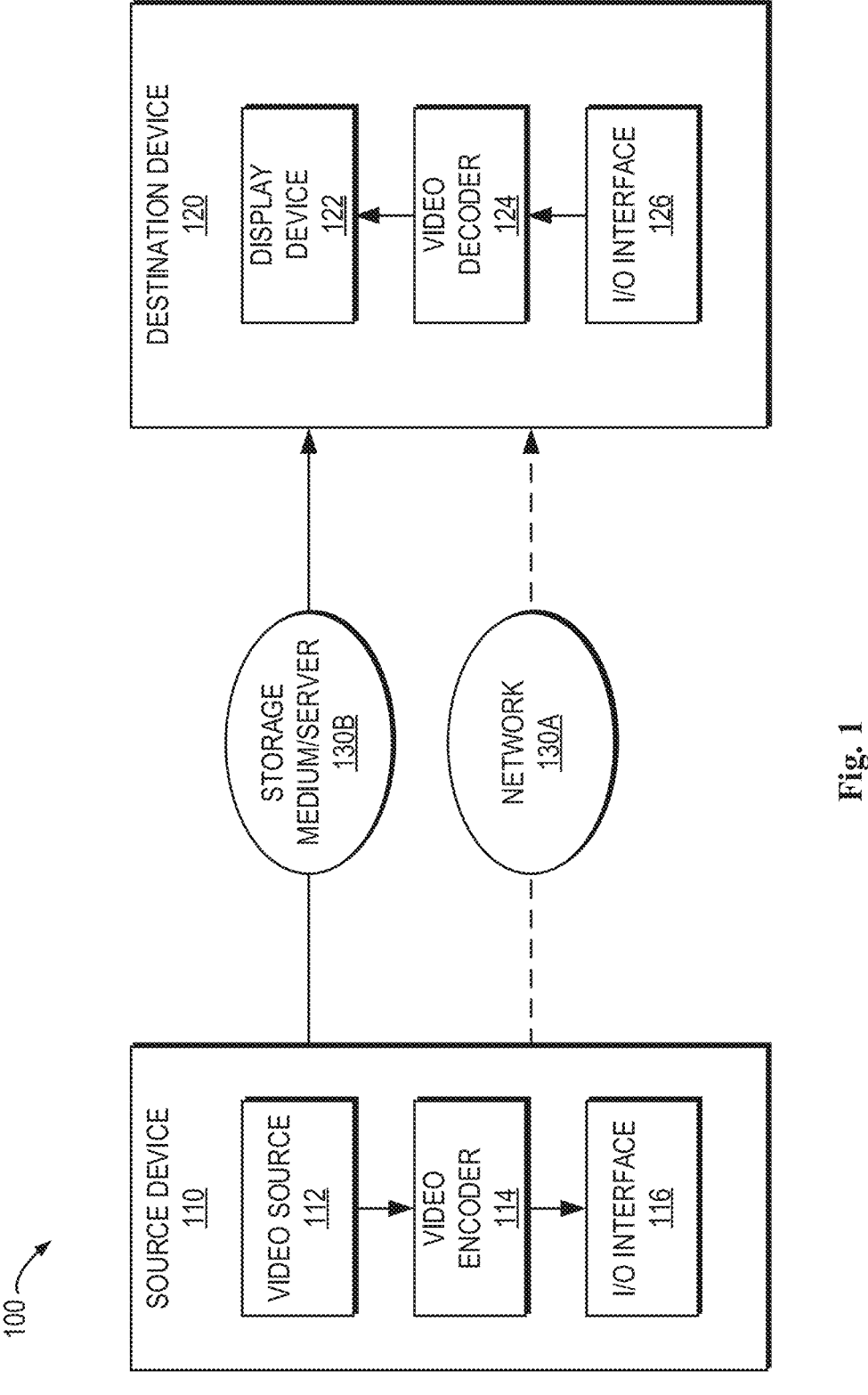
FIG. 1 illustrates a block diagram that illustrates an example video coding system, in accordance with some embodiments of the present disclosure.

FIG. 1 is a block diagram that illustrates an example video coding system 100 that may utilize the techniques of this disclosure. As shown, the video coding system 100 may include a source device 110 and a destination device 120. The source device 110 can be also referred to as a video encoding device, and the destination device 120 can be also referred to as a video decoding device. In operation, the source device 110 can be configured to generate encoded video data and the destination device 120 can be configured to decode the encoded video data generated by the source device 110. The source device 110 may include a video source 112, a video encoder 114, and an input/output (I/O) interface 116.

The video source 112 may include a source such as a video capture device. Examples of the video capture device include, but are not limited to, an interface to receive video data from a video content provider, a computer graphics system for generating video data, and/or a combination thereof.

The video data may comprise one or more pictures. The video encoder 114 encodes the video data from the video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. The I/O interface 116 may include a modulator/demodulator and/or a transmitter. The encoded video data may be transmitted directly to destination device 120 via the I/O interface 116 through the network 130A. The encoded video data may also be stored onto a storage medium/server 130B for access by destination device 120.

The destination device 120 may include an I/O interface 126, a video decoder 124, and a display device 122. The I/O interface 126 may include a receiver and/or a modem. The I/O interface 126 may acquire encoded video data from the source device 110 or the storage medium/server 130B. The video decoder 124 may decode the encoded video data. The display device 122 may display the decoded video data to a user. The display device 122 may be integrated with the destination device 120, or may be external to the destination device 120 which is configured to interface with an external display device.

The video encoder 114 and the video decoder 124 may operate according to a video compression standard, such as the High Efficiency Video Coding (HEVC) standard, Versatile Video Coding (VVC) standard and other current and/or further standards.

Figure 2:
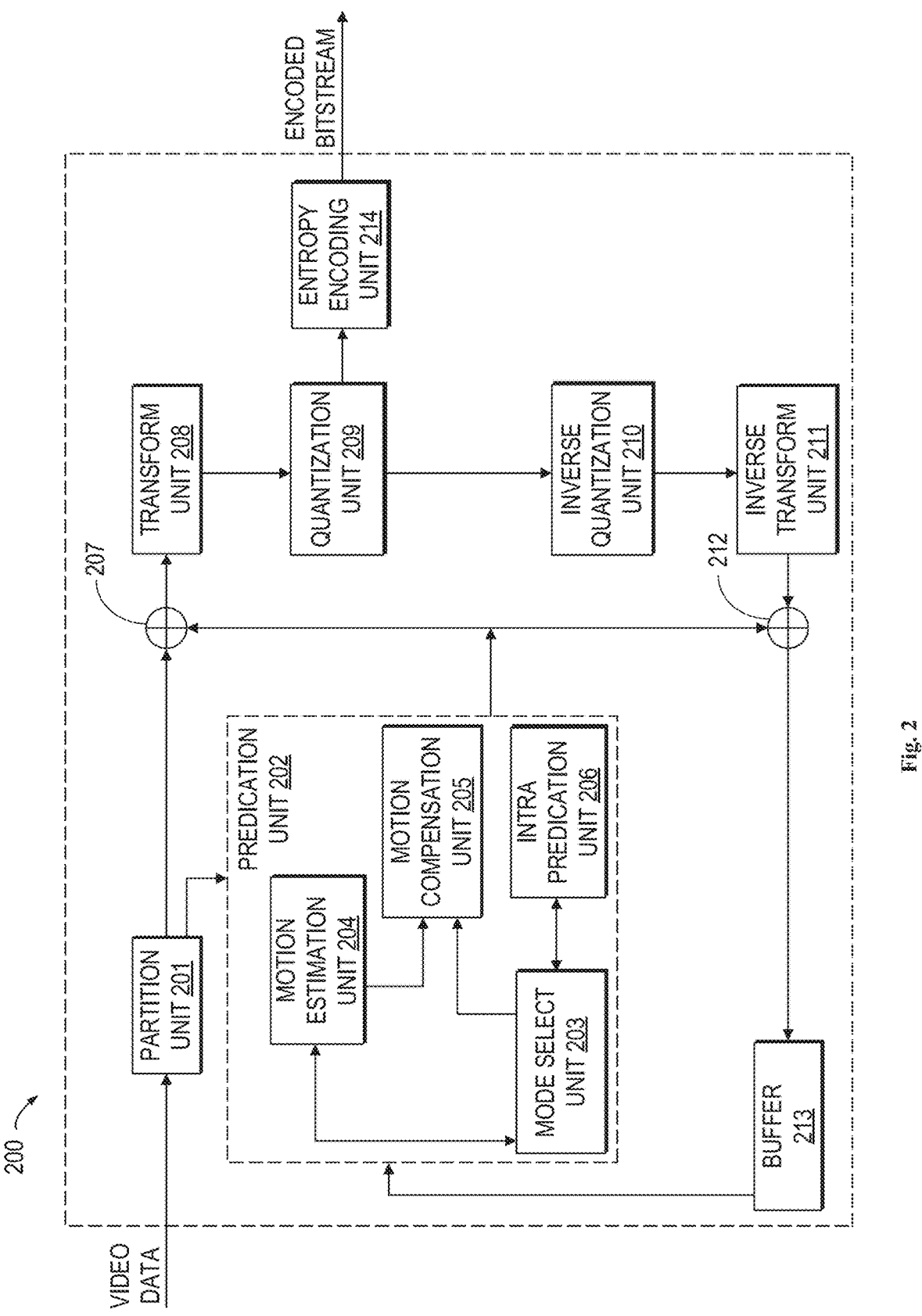
FIG. 2 illustrates a block diagram that illustrates a first example video encoder, in accordance with some embodiments of the present disclosure.

FIG. 2 is a block diagram illustrating an example of a video encoder 200, which may be an example of the video encoder 114 in the system 100 illustrated in FIG. 1, in accordance with some embodiments of the present disclosure.

The video encoder 200 may be configured to implement any or all of the techniques of this disclosure. In the example of FIG. 2, the video encoder 200 includes a plurality of functional components. The techniques described in this disclosure may be shared among the various components of the video encoder 200. In some examples, a processor may be configured to perform any or all of the techniques described in this disclosure.

In some embodiments, the video encoder 200 may include a partition unit 201, a predication unit 202 which may include a mode select unit 203, a motion estimation unit 204, a motion compensation unit 205 and an intra-prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, the video encoder 200 may include more, fewer, or different functional components. In an example, the predication unit 202 may include an intra block copy (IBC) unit. The IBC unit may perform predication in an IBC mode in which at least one reference picture is a picture where the current video block is located.

Furthermore, although some components, such as the motion estimation unit 204 and the motion compensation unit 205, may be integrated, but are represented in the example of FIG. 2 separately for purposes of explanation.

The partition unit 201 may partition a picture into one or more video blocks. The video encoder 200 and the video decoder 300 may support various video block sizes.

The mode select unit 203 may select one of the coding modes, intra or inter, e.g., based on error results, and provide the resulting intra-coded or inter-coded block to a residual generation unit 207 to generate residual block data and to a reconstruction unit 212 to reconstruct the encoded block for use as a reference picture. In some examples, the mode select unit 203 may select a combination of intra and inter predication (CIIP) mode in which the predication is based on an inter predication signal and an intra predication signal. The mode select unit 203 may also select a resolution for a motion vector (e.g., a sub-pixel or integer pixel precision) for the block in the case of inter-predication.

To perform inter prediction on a current video block, the motion estimation unit 204 may generate motion information for the current video block by comparing one or more reference frames from buffer 213 to the current video block. The motion compensation unit 205 may determine a predicted video block for the current video block based on the motion information and decoded samples of pictures from the buffer 213 other than the picture associated with the current video block.

The motion estimation unit 204 and the motion compensation unit 205 may perform different operations for a current video block, for example, depending on whether the current video block is in an I-slice, a P-slice, or a B-slice. As used herein, an "I-slice" may refer to a portion of a picture composed of macroblocks, all of which are based upon macroblocks within the same picture. Further, as used herein, in some aspects, "P-slices" and "B-slices" may refer to portions of a picture composed of macroblocks that are not dependent on macroblocks in the same picture.

In some examples, the motion estimation unit 204 may perform uni-directional prediction for the current video block, and the motion estimation unit 204 may search reference pictures of list 0 or list 1 for a reference video block for the current video block. The motion estimation unit 204 may then generate a reference index that indicates the reference picture in list 0 or list 1 that contains the reference video block and a motion vector that indicates a spatial displacement between the current video block and the reference video block. The motion estimation unit 204 may output the reference index, a prediction direction indicator, and the motion vector as the motion information of the current video block. The motion compensation unit 205 may generate the predicted video block of the current video block based on the reference video block indicated by the motion information of the current video block.

Alternatively, in other examples, the motion estimation unit 204 may perform bi-directional prediction for the current video block. The motion estimation unit 204 may search the reference pictures in list 0 for a reference video block for the current video block and may also search the reference pictures in list 1 for another reference video block for the current video block. The motion estimation unit 204 may then generate reference indexes that indicate the reference pictures in list 0 and list 1 containing the reference video blocks and motion vectors that indicate spatial displacements between the reference video blocks and the current video block. The motion estimation unit 204 may output the reference indexes and the motion vectors of the current video block as the motion information of the current video block. The motion compensation unit 205 may generate the predicted video block of the current video block based on the reference video blocks indicated by the motion information of the current video block.

In some examples, the motion estimation unit 204 may output a full set of motion information for decoding processing of a decoder. Alternatively, in some embodiments, the motion estimation unit 204 may signal the motion information of the current video block with reference to the motion information of another video block. For example, the motion estimation unit 204 may determine that the motion information of the current video block is sufficiently similar to the motion information of a neighboring video block.

In one example, the motion estimation unit 204 may indicate, in a syntax structure associated with the current video block, a value that indicates to the video decoder 300 that the current video block has the same motion information as the another video block.

In another example, the motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

The intra prediction unit 206 may perform intra prediction on the current video block. When the intra prediction unit 206 performs intra prediction on the current video block, the intra prediction unit 206 may generate prediction data for the current video block based on decoded samples of other video blocks in the same picture. The prediction data for the current video block may include a predicted video block and various syntax elements.

The residual generation unit 207 may generate residual data for the current video block by subtracting (e.g., indicated by the minus sign) the predicted video block (s) of the current video block from the current video block. The residual data of the current video block may include residual video blocks that correspond to different sample components of the samples in the current video block.

In other examples, there may be no residual data for the current video block for the current video block, for example in a skip mode, and the residual generation unit 207 may not perform the subtracting operation.

The transform processing unit 208 may generate one or more transform coefficient video blocks for the current video block by applying one or more transforms to a residual video block associated with the current video block.

After the transform processing unit 208 generates a transform coefficient video block associated with the current video block, the quantization unit 209 may quantize the transform coefficient video block associated with the current video block based on one or more quantization parameter (QP) values associated with the current video block.

The inverse quantization unit 210 and the inverse transform unit 211 may apply inverse quantization and inverse transforms to the transform coefficient video block, respectively, to reconstruct a residual video block from the transform coefficient video block. The reconstruction unit 212 may add the reconstructed residual video block to corresponding samples from one or more predicted video blocks generated by the predication unit 202 to produce a reconstructed video block associated with the current video block for storage in the buffer 213.

After the reconstruction unit 212 reconstructs the video block, loop filtering operation may be performed to reduce video blocking artifacts in the video block.

The entropy encoding unit 214 may receive data from other functional components of the video encoder 200. When the entropy encoding unit 214 receives the data, the entropy encoding unit 214 may perform one or more entropy encoding operations to generate entropy encoded data and output a bitstream that includes the entropy encoded data.

Figure 3:
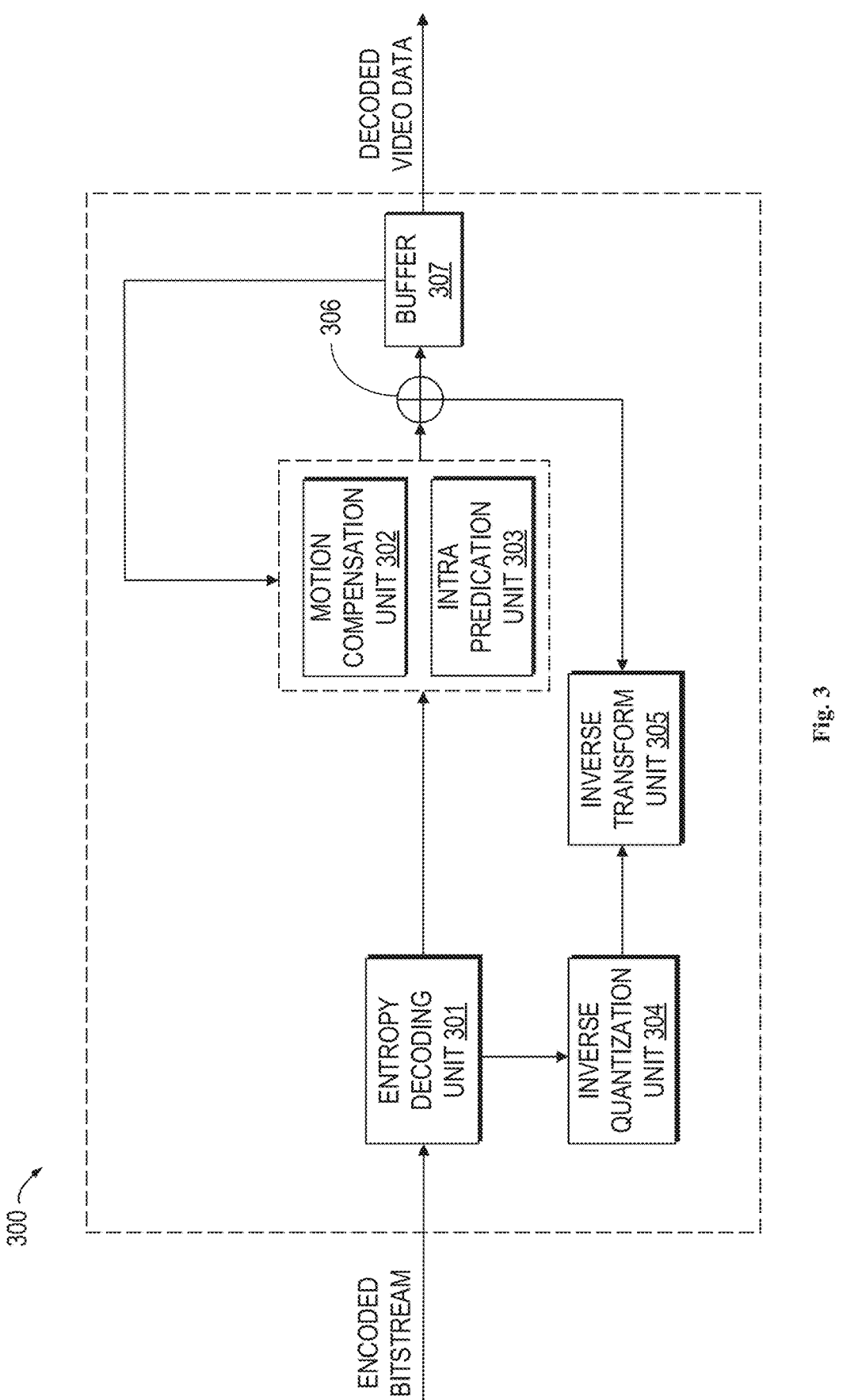
FIG. 3 illustrates a block diagram that illustrates an example video decoder, in accordance with some embodiments of the present disclosure.

FIG. 3 is a block diagram illustrating an example of a video decoder 300, which may be an example of the video decoder 124 in the system 100 illustrated in FIG. 1, in accordance with some embodiments of the present disclosure.

The video decoder 300 may be configured to perform any or all of the techniques of this disclosure. In the example of FIG. 3, the video decoder 300 includes a plurality of functional components. The techniques described in this disclosure may be shared among the various components of the video decoder 300. In some examples, a processor may be configured to perform any or all of the techniques described in this disclosure.

In the example of FIG. 3, the video decoder 300 includes an entropy decoding unit 301, a motion compensation unit 302, an intra prediction unit 303, an inverse quantization unit 304, an inverse transformation unit 305, and a reconstruction unit 306 and a buffer 307. The video decoder 300 may in some examples, perform a decoding pass generally reciprocal to the encoding pass described with respect to video encoder 200.

The entropy decoding unit 301 may retrieve an encoded bitstream. The encoded bitstream may include entropy coded video data (e.g., encoded blocks of video data). The entropy decoding unit 301 may decode the entropy coded video data, and from the entropy decoded video data, the motion compensation unit 302 may determine motion information including motion vectors, motion vector precision, reference picture list indexes, and other motion information. The motion compensation unit 302 may for example, determine such information by performing the AMVP and merge mode. AMVP is used, including derivation of several most probable candidates based on data from adjacent PBs and the reference picture. Motion information typically includes the horizontal and vertical motion vector displacement values, one or two reference picture indices, and, in the case of prediction regions in B slices, an identification of which reference picture list is associated with each index. As used herein, in some aspects, a "merge mode" may refer to deriving the motion information from spatially or temporally neighboring blocks.

The motion compensation unit 302 may produce motion compensated blocks, possibly performing interpolation based on interpolation filters. Identifiers for interpolation filters to be used with sub-pixel precision may be included in the syntax elements.

The motion compensation unit 302 may use the interpolation filters as used by the video encoder 200 during encoding of the video block to calculate interpolated values for sub-integer pixels of a reference block. The motion compensation unit 302 may determine the interpolation filters used by the video encoder 200 according to the received syntax information and use the interpolation filters to produce predictive blocks.

The motion compensation unit 302 may use at least part of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence. As used herein, in some aspects, a "slice" may refer to a data structure that can be decoded independently from other slices of the same picture, in terms of entropy coding, signal prediction, and residual signal reconstruction. A slice can either be an entire picture or a region of a picture.

The intra prediction unit 303 may use intra prediction modes for example received in the bitstream to form a prediction block from spatially adjacent blocks. The inverse quantization unit 304 inverse quantizes, i.e., de-quantizes, the quantized video block coefficients provided in the bitstream and decoded by entropy decoding unit 301. The inverse transform unit 305 applies an inverse transform.

The reconstruction unit 306 may obtain the decoded blocks, e.g., by summing the residual blocks with the corresponding prediction blocks generated by the motion compensation unit 302 or intra-prediction unit 303. If desired, a deblocking filter may also be applied to filter the decoded blocks in order to remove blockiness artifacts. The decoded video blocks are then stored in the buffer 307, which provides reference blocks for subsequent motion compensation/intra predication and also produces decoded video for presentation on a display device.

Some exemplary embodiments of the present disclosure will be described in detailed hereinafter. It should be understood that section headings are used in the present document to facilitate ease of understanding and do not limit the embodiments disclosed in a section to only that section. Furthermore, while certain embodiments are described with reference to Versatile Video Coding or other specific video codecs, the disclosed techniques are applicable to other video coding technologies also. Furthermore, while some embodiments describe video coding steps in detail, it will be understood that corresponding steps decoding that undo the coding will be implemented by a decoder. Furthermore, the term video processing encompasses video coding or compression, video decoding or decompression and video transcoding in which video pixels are represented from one compressed format into another compressed format or at a different compressed bitrate.

1. Summary

This disclosure is related to video coding technologies. Specifically, it is about simplifications for template matching method in video coding. The ideas may be applied individually or in various combination, to any video coding standard or non-standard video codec.

2. Background

The exponential increasing of multimedia data poses a critical challenge for video coding. To satisfy the increasing demands for more efficient compression technology, ITU-T and ISO/IEC have developed a series of video coding standards in the past decades. In particular, the ITU-T produced H.261 and H.263, ISO/IEC produced MPEG-1 and MPEG-4 visual, and the two organizations jointly developed the H.262/MPEG-2 Video, H.264/MPEG-4 Advanced Video Coding (AVC), H.265/HEVC and the latest VVC standards. Since H.262/MPEG-2, hybrid video coding framework is employed wherein in intra/inter prediction plus transform coding are utilized.

2.1 MVP in Video Coding

Inter prediction aims to remove the temporal redundancy between adjacent frames, which serves as an indispensable component in the hybrid video coding framework. Specifically, inter prediction makes use of the contents specified by motion vector (MV) as the predicted version of the current to-be-coded block, thus only residual signals and motion information are transmitted in the bitstream. To reduce the cost for MV signaling, motion vector prediction (MVP) came into being as an effective mechanism to convey motion information. Early strategies simply use the MV of a specified neighboring block or the median MV of neighboring blocks as MVP. In H.265/HEVC, competing mechanism was involved where the optimal MVP is selected from multiple candidates through rate distortion optimization (RDO). In particular, advanced MVP (AMVP) mode and merge mode are devised with different motion information signaling strategy. With the AMVP mode, a reference index, a MVP candidate index referring to an AMVP candidate list and motion vector difference (MVD) is signaled. Regarding the merge mode, only a merge index referring to a merge candidate list is signaled, and all the motion information associated with the merge candidate is inherited. Both AMVP mode and merge mode need to construct MVP candidate list, and the details of the construction process for these two modes are described as follows.

Figure 4:
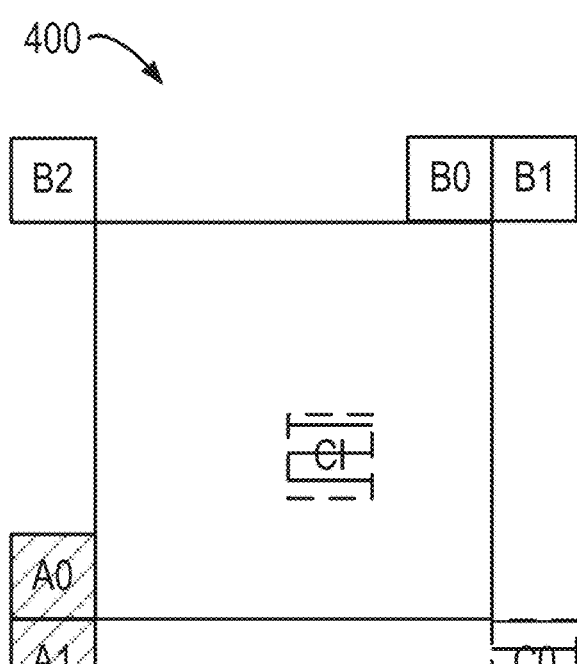
FIG. 4 illustrates an example diagram showing positions of spatial and temporal neighboring blocks used in AMVP/ merge candidate list construction.

AMVP mode: AMVP exploits spatial-temporal correlation of motion vector with neighboring blocks, which is used for explicit transmission of motion parameters. For each reference picture list, a motion vector candidate list is constructed by firstly checking availability of left, above temporally neighboring positions, removing redundant candidates and adding zero vector to make the candidate list to be constant length. FIG. 4 illustrates an example diagram 400 showing positions of spatial and temporal neighboring blocks used in AMVP/merge candidate list construction. For spatial motion vector candidate derivation, two motion vector candidates are eventually derived based on motion vectors of blocks located in five different positions as depicted in FIG. 4. The five neighboring blocks located at B0, B1, B2, and A0, A1 are classified into two groups, where Group A includes the three above spatial neighboring blocks and Group B includes the two left spatial neighboring blocks. The two MV candidates are respectively derived with the first available candidate from Group A and Group B in a predefined order. For temporal motion vector candidate derivation, one motion vector candidate is derived based on two different co-located positions (bottom-right (C0) and central (C1)) checked in order, as depicted in FIG. 4. To avoid redundant MV candidates, duplicated motion vector candidates in the list are abandoned. If the number of potential candidates is smaller than two, additional zero motion vector candidates are added to the list.

Merge mode: Similar to AMVP mode, MVP candidate list for merge mode comprises of spatial and temporal candidates as well. For spatial motion vector candidate derivation, at most four candidates are selected with order A1, B1, B0, A0 and B2 after performing availability and redundant checking. For temporal merge candidate (TMVP) derivation, at most one candidate is selected from two temporal neighboring blocks (C0 and C1). When there are not enough merge candidates with spatial and temporal candidates, combined bi-predictive merge candidates and zero MV candidates are added to MVP candidate list. Once the number of available merge candidates reaches the signaled maximally allowed number, the merge candidate list construction process is terminated.

In VVC, the construction process for merge mode is further improved by introducing the history-based MVP (HMVP), which incorporates the motion information of previously coded blocks which may be far away from current block. In VVC, HMVP merge candidates are appended to merge list after the spatial MVP and TMVP. In this method, the motion information of a previously coded block is stored in a table and used as MVP for the current CU. The table with multiple HMVP candidates is maintained with first-in-first-out strategy during the encoding/decoding process. Whenever there is a non-subblock inter-coded CU, the associated motion information is added to the last entry of the table as a new HMVP candidate.

Figure 5:
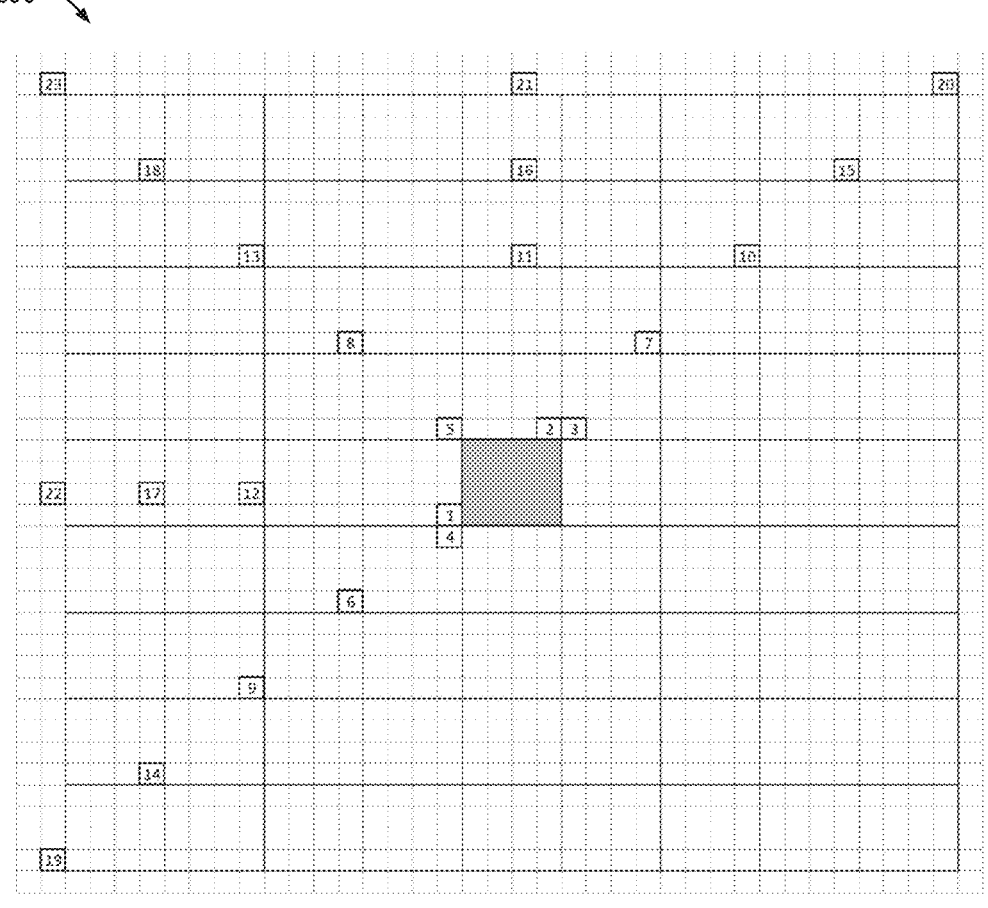
FIG. 5 illustrates an example diagram showing positions of non-adjacent candidate in ECM.

FIG. 5 illustrates an example diagram 500 showing positions of non-adjacent candidate in ECM. During the standardization of VVC, Non-adjacent MVP was proposed to facilitate better motion information derivation by exploiting the non-adjacent area. In ECM software, Non-adjacent MVP are inserted between TMVP and HMVP, where the distances between non-adjacent spatial candidates and current coding block are based on the width and height of current coding block as depicted in FIG. 5.

2.2 Interpolation Filters in VVC

In VVC, interpolations filters are used in both intra and inter coding process. Intra coding takes advantage of interpolation filters to generate fractional positions in angular prediction modes. In HEVC, a two-tap linear interpolation filter has been used to generate the intra prediction block in the directional prediction modes (i.e., excluding Planar and DC predictors). While in VVC, four-tap intra interpolation filters are utilized to improve the angular intra prediction accuracy. In particular, two sets of 4-tap interpolation filters are utilized in VVC intra coding, which are DCT-based interpolation filter (DCTIF) and smoothing interpolation filter (SIF). The DCTIF is constructed in the same way as the one used for chroma component motion compensation in both HEVC and VVC. The SIF is obtained by convolving the 2-tap linear interpolation filter with [1 2 1]/4 filter.

In VVC, the highest precision of explicitly signaled motion vectors is quarter-luma-sample. In some inter prediction modes such as the affine mode, motion vectors are derived at $\frac{1}{16}$th-luma-sample precision and motion compensated prediction is performed at $\frac{1}{16}$th-sample-precision. VVC allows different MVD precision ranging from $\frac{1}{16}$-luma-sample to 4-luma-sample. For half-luma-sample precision, 6-tap interpolation filter is used. While for other fractional precisions, default 8-tap filter is used. Besides, the bilinear interpolation filter is used to generate the fractional samples for the searching process of decoder side motion vector refinement (DMVR) in VVC.

2.3 Template Matching Merge/AMVP Mode in ECM

Figure 6:
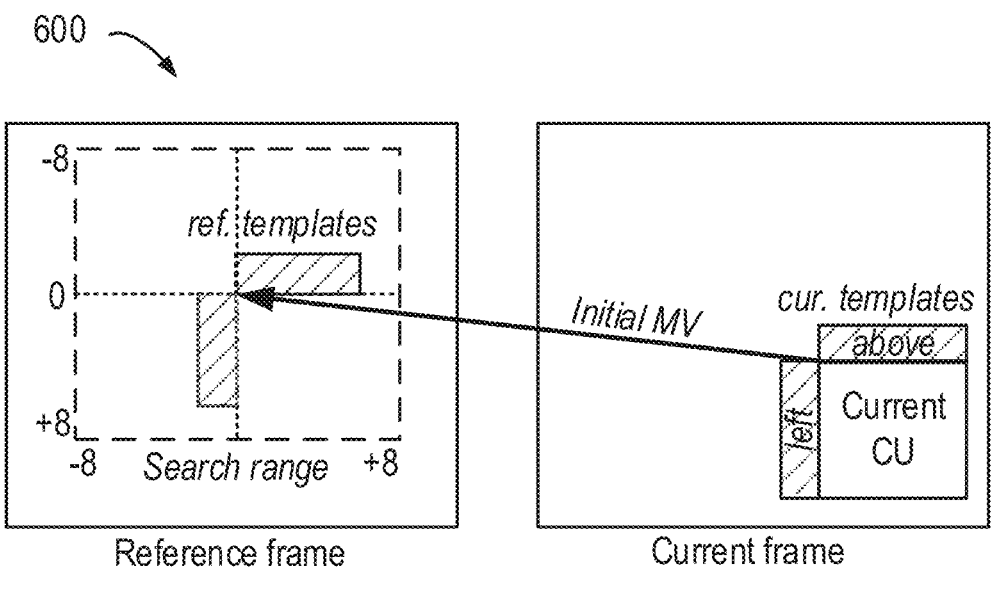
FIG. 6 illustrates an example diagram showing template matching performs on a search area around initial MV.

Template matching (TM) merge/AMVP mode is a decoder-side MV derivation method to refine the motion information of the current CU by finding the closest match between a template (i.e., top and/or left neighboring blocks of the current CU) in the current picture and a block (i.e., same size to the template) in a reference picture. FIG. 6 illustrates an example diagram 600 showing template matching performs on a search area around initial MV. As illustrated in FIG. 6, a better MV is to be searched around the initial motion of the current CU within a [−8, +8]-pel search range.

In AMVP mode, an MVP candidate is determined based on the template matching error to pick up the one which reaches the minimum difference between the current block and the reference block templates, and then TM performs only for this particular MVP candidate for MV refinement. TM refines this MVP candidate, starting from full-pel MVD precision (or 4-pel for 4-pel AMVR mode) within a [−8, +8]-pel search range by using iterative diamond search. The AMVP candidate may be further refined by using cross search with full-pel MVD precision (or 4-pel for 4-pel AMVR mode), followed sequentially by half-pel and quarter-pel ones depending on AMVR mode. This search process ensures that the MVP candidate still keeps the same MV precision as indicated by adaptive motion vector resolution (AMVR) mode after TM process. In the merge mode, similar search method is applied to the merge candidate indicated by the merge index. TM merge may perform all the way down to $\frac{1}{8}$-pel MVD precision or skipping those beyond half-pel MVD precision, depending on whether the alternative interpolation filter (that is used when AMVR is of half-pel mode) is used according to merged motion information. Besides, when TM mode is enabled, template matching may work as an independent process or an extra MV refinement process between block-based and subblock-based bilateral matching (BM) methods, depending on whether BM can be enabled or not according to its enabling condition check. When BM and TM are both enabled for a CU, the search process of TM stops at half-pel MVD precision and the resulted MVs are further refined by using the same model-based MVD derivation method as in DMVR.

2.4 Adaptive Reorder of Merge Candidates (ARMC)

Inspired by the spatial correlation between reconstructed neighboring pixels and the current coding block, adaptive reorder of merge candidates (ARMC) was proposed to refine the candidates order in a given candidate list. The underlying assumption is that the candidates with less template matching cost have higher probability to be chosen through RDO process, hence should be placed in front positions within the list to reduce the signaling cost.

The reordering method is applied to regular merge mode, template matching (TM) merge mode, and affine merge mode (excluding the SbTMVP candidate). For the TM merge mode, merge candidates are reordered before the refinement process.

After a merge candidate list is constructed, merge candidates are divided into several subgroups. The subgroup size is set to 5. Merge candidates in each subgroup are reordered ascendingly according to cost values based on template matching. For simplification, merge candidates in the last but not the first subgroup are not reordered.

Figure 7:
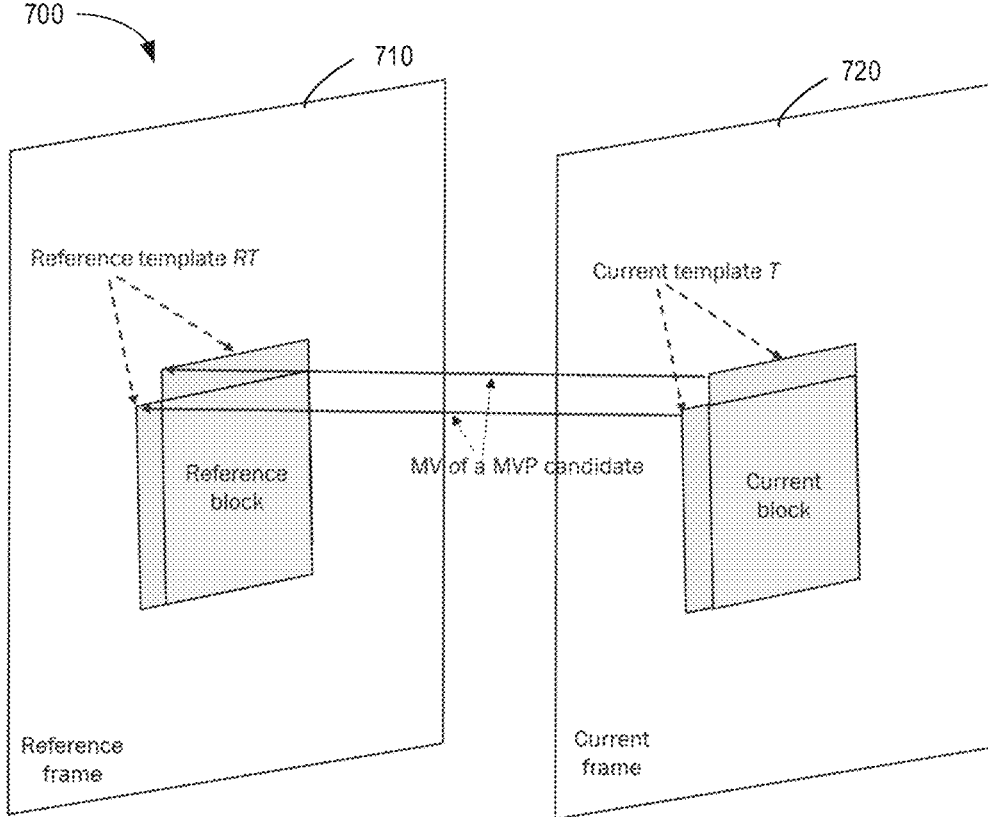
FIG. 7 illustrates an example diagram showing template and the corresponding reference template.

FIG. 7 illustrates an example diagram 700 showing template 720 and the corresponding reference template 710. The template matching cost is measured by the sum of absolute differences (SAD) between samples of a template 720 of the current block and their corresponding reference template 710. The template comprises a set of reconstructed samples neighboring to the current block, while reference template 710 is located by the same motion information of the current block, as illustrated in FIG. 7. When a merge candidate utilizes bi-directional prediction, the reference samples of the template of the merge candidate are also generated by bi-prediction.

Figure 8:
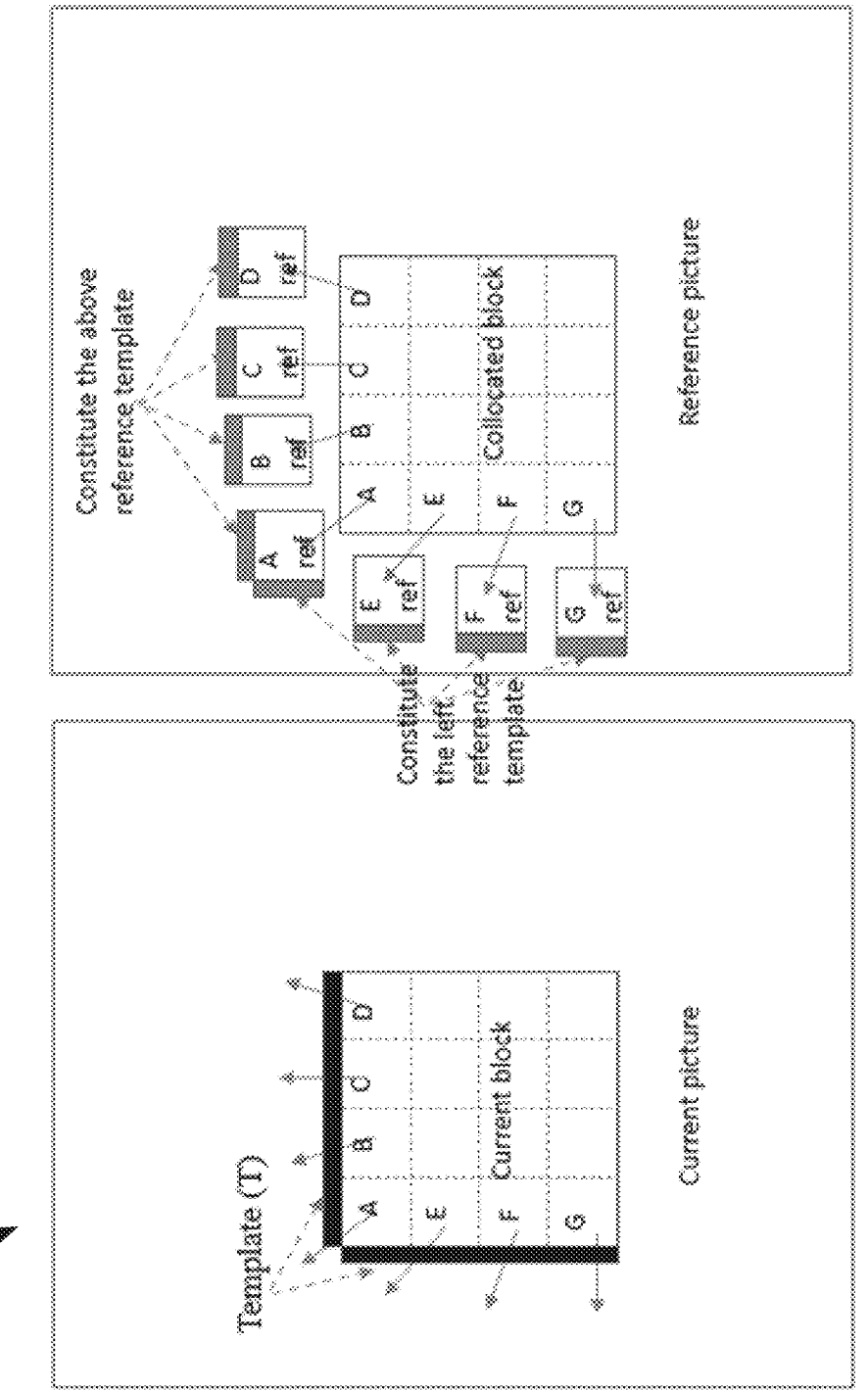
FIG. 8 illustrates an example diagram showing template and reference template for block with sub-block motion using the motion information of the subblocks of current block.

For subblock-based merge candidates with subblock size equal to Wsub*Hsub, the above template comprises several sub-templates with the size of Wsub×1, and the left template comprises several sub-templates with the size of 1×Hsub. FIG. 8 illustrates an example diagram 800 showing template and reference template for block with sub-block motion using the motion information of the subblocks of current block. As shown in FIG. 8, the motion information of the subblocks in the first row and the first column of current block is used to derive the reference samples of each sub-template.

2.5 Enhanced MVP Candidate Derivation (EMCD)

EMCD based on template matching cost reordering is proposed. Instead of constructing the MVP list based on a predefined traversing order, an optimized MVP selecting approach is investigated by taking advantage of the matching cost in the reconstructed template region, such that more appropriate candidates are included in the list.

3. Problems

Existing template matching based video coding tools, including but not limited to ARMC, EMCD and template matching MV refinement, normally require fractional interpolation to get reference template, which brings heavy complexity burdens especially to the decoder side.

4. Detailed Descriptions

In this disclosure, the template matching based video coding methods are optimized in two aspects. Firstly, reference template derivation process is revised that the interpolation process in the prediction block generation process is replaced by different ways. Secondly, several fast strategies are devised to speedup the tools related to template matching.

It should be noted that the proposed methods can be utilized in ARMC, EMCD and template matching MV refinement, and can also be easily extended to other potential utilizations that require template matching process, e.g., template matching based candidates reorder for merge with motion vector difference (MMVD), Affine motion compensation, Subblock-based temporal motion vector prediction (SbTMVP) and so on. In yet another example, the proposed methods could be applied to other coding tools that requires motion information refinement processes, e.g., bilateral matching-based coding tools.

The detailed embodiments below should be considered as examples to explain general concepts. These embodiments should not be interpreted in a narrow way. Furthermore, these embodiments can be combined in any manner. Combination between this patent application and others are also applicable.

1. It is proposed to replace the interpolation filtering process involved in the motion compensation process of an inter prediction signal generation process by other ways in the reference template generation process.

a) It is proposed to exclude interpolation filtering process to generate a reference template even the motion vector point to fractional positions.

i. In one example, it is proposed to use an integer precision to generate a reference template.

ii. In one example, if a motion vector points to a fractional position, it is rounded to be an integer MV firstly.

1. In one example, the fractional position is rounded toward zero (that is, a negative motion vector predictor is rounded toward positive infinity and a positive motion vector predictor is rounded toward negative infinity).

2. In one example, the round step may larger than 1.

b) It is proposed to use a different interpolation filter to generate reference templates for motion vectors pointing to fractional positions.

i. In one example, a simplified interpolation filter may be applied.

1. In one example, the simplified interpolation filter can be 2-tap bilinear, alternatively, it can also be 4-tap, 6-tap or 8-tap filter that belongs to DCT, DST, Lanczos or any other interpolation types.

ii. In one example, a more complex interpolation filter (e.g., with longer filter taps) may be applied.

c) The above methods may be used to reorder the merge candidates for template matching merge mode.

i. In one example, integer precision can be used in ARMC, EMCD, LIC and any other potential scenarios, ii. The above methods may be used to reorder the candidates for regular merge mode.

1. In one example, integer precision can be used to reorder the candidates for regular merge mode.

d) In one example, whether to use above methods (e.g., integer precision, different interpolation filters) or not and/or how to use above methods can be signaled in the bitstream or determined on-the-fly according to decoded information.

i. In one example, which method to be applied may be dependent on the coding tool.

ii. In one example, which method to be applied may be dependent on block dimension.

iii. In one example, integer precision may be used for a given color component (e.g., luma only).

iv. Alternatively, integer precision may be used all of the three components.

2. Whether to and/or how to perform EMCD may be based on the maximum allowed candidate number within candidate list and/or available candidate number before being added to a candidate list.

a) In one example, assuming the number of available candidates (valid candidates that can be used to build candidate list) is $N_{AVAL}$, and the maximum allowed candidate number is $N_{MAX}$ (that is, at most $N_{MAX}$ candidates can be included into the ultimate merge list), then EMCD is enabled only when $N_{AVAL}-N_{MAX}$ larger than a constant or adaptively derived threshold T.

3. It is proposed to organize the available merge candidates into subgroups.

a) In one example, the available candidates can be categorized into subgroups, each subgroup contains a fixed or adaptively derived number of candidates, and each subgroup selects a fix number of candidates into the list. In the decoder side, only the candidates within a chosen subgroup need to be reordered.

b) In one example, the candidates can be categorized into subgroups according to the candidates' type, such as non-adjacent MVP, temporal MVP (TMVP) or HMVP, etc.

4. It is proposed that a piece of information calculated by a first coding tool utilizing at least one template cost may be reused by a second coding tool utilizing at least one template cost.

a) It is proposed to build a unified storage shared by ARMC, EMCD and any other potential tools to store the information of each merge candidate.

b) In one example, this storage can be a map, table or other data structure.

c) In one example, the stored information can be template matching cost.

d) In one example, EMCD first traverses all the MVs associated with the available candidates and store the corresponding information (including but not limited to template matching cost) in this storage. Then ARMC and/or other potential tools can simply access the needed information from this shared storage without performing repeating calculation.

5. Embodiments

Figure 9:
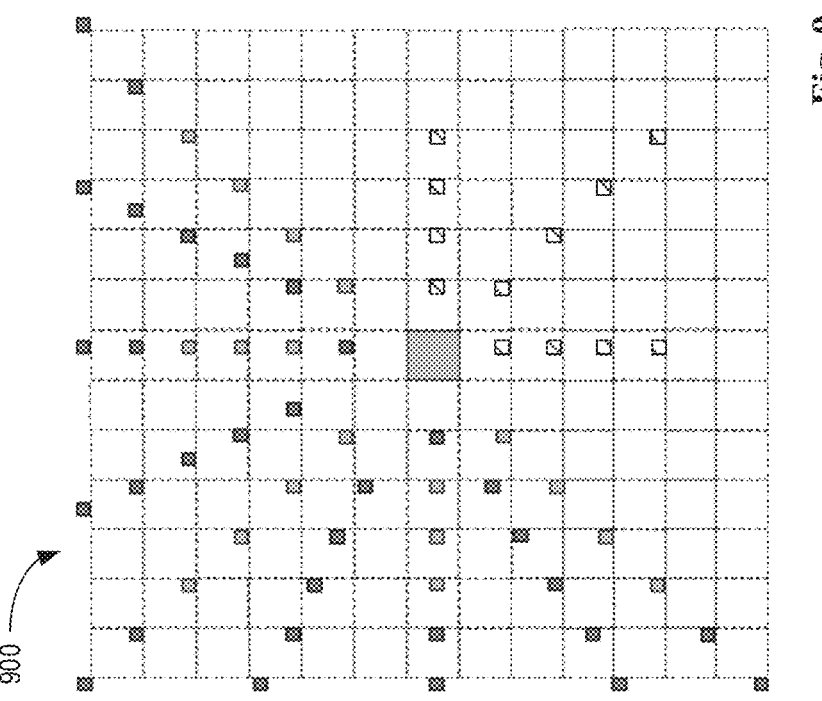
FIG. 9 illustrates an example diagram showing non-adjacent positions used in this proposal.

FIG. 9 illustrates an example diagram 900 showing non-adjacent positions used in this proposal.

In this contribution, a method of template matching based merge candidate list construction (TM-MCLC) is proposed. Instead of putting non-adjacent and HMVP candidates into the merge candidate list in a predefined traversing order, TM-MCLC puts non-adjacent and HMVP candidates into the merge candidate list in an ascending order of template matching costs.

In ECM, non-adjacent and HMVP candidates are put into the merge candidate list based on a predefined traversing order after adjacent candidates and TMVP candidates. With TM-MCLC, non-adjacent and HMVP candidates are still put into the merge candidate list after adjacent candidates and TMVP candidates, but in an ascending order of template matching costs.

More specifically, all available non-adjacent MVP and HMVP are collected in a group. Then TM cost associated with each candidate in the group is derived in a similar way to ARMC. Subsequently, all the candidates in the group are sorted in an ascending order regarding the corresponding TM costs. Finally, non-adjacent and HMVP candidates are put into the merge candidate list an ascending order of template matching costs.

In this proposal, non-adjacent MVPs in ECM software is further extended with more spatial and non-adjacent temporal positions, as shown in FIG. 9. Besides the 18 positions for non-adjacent spatial MVPs in ECM-2.0, additional 32 spatial positions and 12 non-adjacent temporal positions are introduced, where non-adjacent temporal MVP positions locate in the same reference frame as the adjacent TMVP.

To reduce the complexity, integer precision is used for TM merge mode while 2-tap bilinear filter is used to generate the reference template for regular merge mode.

The embodiments of the present disclosure are related to reference template derivation and template matching based video coding tools. As used herein, the term "block" may represent a coding tree block (CTB), a coding tree unit (CTU), a coding block (CB), a coding unit (CU), a prediction unit (PU), a transform unit (TU), a prediction block (PB), a transform block (TB), or a video processing unit comprising a plurality of samples or pixels. A block may be rectangular or non-rectangular.

It is to be understood that the present methods can be utilized in ARMC, EMCD and template matching MV refinement, and can also be easily extended to other potential utilizations that require template matching process, e.g., template matching based candidates reorder for merge with motion vector difference (MMVD), Affine motion compensation, Subblock-based temporal motion vector prediction (SbTMVP) and so on. In yet another example, the proposed methods could be applied to other coding tools that requires motion information refinement processes, e.g., bilateral matching-based coding tools.

Figure 10:
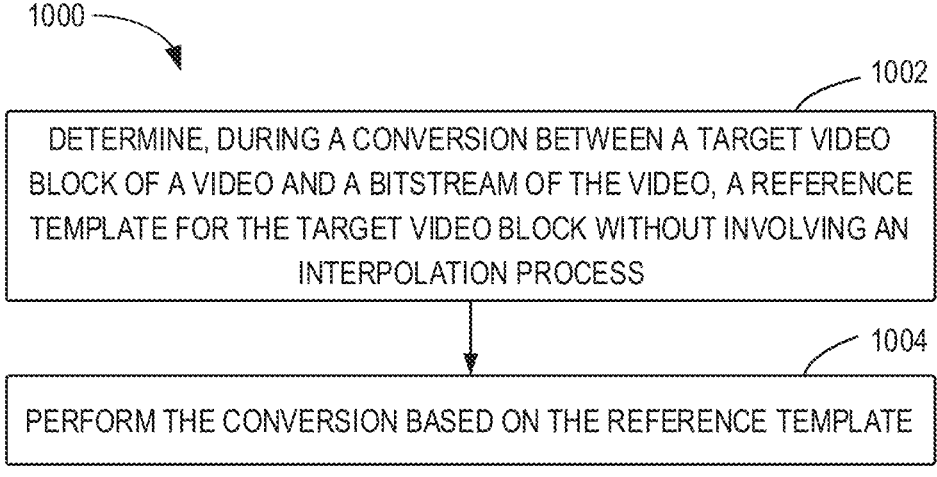
FIG. 10 illustrates a flowchart of a method for video processing in accordance with some embodiments of the present disclosure.

FIG. 10 illustrates a flowchart of a method 1000 for video processing in accordance with some embodiments of the present disclosure. The method 1000 may be implemented during a conversion between a target video block of a video and a bitstream of the video. As shown in FIG. 10, at block 1002, a reference template is determined for the target video block without involving an interpolation process.

Compared with the conventional solution where an interpolation process is involved, the proposed method without the interpolation process can improve the coding efficiency of the reference template derivation, and thus improve the coding effectiveness and coding efficiency.

At block 1004, the conversion is performed based on the reference template. In some embodiments, the conversion may include encoding the target video block into the bitstream. Alternatively, or in addition, the conversion may include decoding the target video block from the bitstream.

In some embodiments, motion compensation of the target video block is determined by using a tool used in determining the reference template. An inter prediction of the target video block may be determined based on the motion compensation. In other words, the interpolation filtering process involved in the motion compensation process of an inter prediction signal generation process can be replaced by other ways in the reference template generation process.

In some embodiments, if a motion vector of the target video block points to a fractional position, the reference template is determined without involving the interpolation process. That is, the interpolation filtering process may be excluded to generate a reference template even the motion vector points to fractional positions.

In some embodiments, the reference template may be determined based on an integer precision. In one example, if a motion vector of the target video block points to a fractional position, the motion vector may be adjusted to an integer motion vector. In some embodiments, the fractional position of the motion vector may be rounded towards zero. In one example, a negative motion vector predictor may be rounded towards positive infinity. In another example, a positive motion vector predictor may be rounded towards negative infinity.

Alternatively, or in addition, in some embodiments, a rounding step used in rounding the fractional position is larger than a threshold. For example, the threshold may be 1.

In some embodiments, if a motion vector of the target video block points to a fractional position, the reference template for the target video block is determined by using an interpolation filter different from a further interpolation filter used in a motion compensation process in generating an inter prediction of the target video block. That is, a different interpolation filter may be used to generate reference templates for motion vectors pointing to fractional positions.

In some embodiments, the interpolation filter may comprise a simplified interpolation filter. For example, the simplified interpolation filter may be a 2-tap bilinear filter. For another example, the simplified interpolation filter may be a 4-tap filter, a 6-tap filter, an 8-tap filter, or any other suitable filter.

In some embodiments, the simplified interpolation filter belongs to one of the following interpolation types: a discrete cosine transform (DCT) type, a discrete sine transform (DST) type, a Lanczos type, or a further interpolation type. It is to be understood that the above interpolation filter types are only for the purpose of illustration, without suggesting any limitation. Scope of the present disclosure is not limited in this regard.

Alternatively, or in addition, in some embodiments, the interpolation filter may comprise a complex interpolation filter. For example, the complex interpolation filter may comprise long filter taps.

In some embodiments, a plurality of merge candidates of the target video block may be reordered based on the reference template. For example, the plurality of merge candidates may be for template matching merge mode. Alternatively, in some embodiments, the plurality of merge candidates may be for regular merge mode. In other words, the above methods may be used to reorder the merge candidates for template matching merge mode or regular merge mode.

In some embodiments, the plurality of merge candidates may be reordered by using an integer precision. In some embodiments, the integer precision may be used in at least one of the following: an adaptive reorder of merge candidates (ARMC), an enhanced motion vector prediction (MVP) list derivation (EMCD), a local illumination compensation (LIC), a template matching based merge candidate list construction (TM-MCLC), or a further coding process. It is to be understood that the above coding tools or coding processes are only for the purpose of illustration, without suggesting any limitations.

In some embodiments, information associated with the method may be included or signaled in the bitstream. Alternatively, or in addition, in some embodiments, the information associated with the method may be determined on-the-fly based on decoded information. For example, the information associated with the method may comprise a usage of an integer precision or a usage of an interpolation filter.

In some embodiments, the information associated with the method comprises whether to use the method. Alternatively, or in addition, in some embodiments, the information associated with the method comprises how to use the method. In other words, whether to use above methods (for example, integer precision, different interpolation filters) or not and/or how to use above methods may be signaled in the bitstream or determined on-the-fly according to decoded information.

In some embodiments, one of the usage of the integer precision and the usage of the interpolation filter is selected based on a coding tool of the target video block. Alternatively, or in addition, in some embodiments, one of the usage of the integer precision and the usage of the interpolation filter is selected based on a block dimension of the target video block. That is, which of the above methods is to be applied may be dependent on the coding tool or block dimension.

In some embodiments, the usage of the integer precision is selected for at least one color component. For example, the at least one color component may comprise a luma component. For another example, the at least one color component may comprise three components, such as a luma component and two chroma components.

In some embodiments, a bitstream of a video may be stored in a non-transitory computer-readable recording medium. The bitstream of the video can be generated by a method performed by a video processing apparatus. According to the method, a reference template for a target video block of the video may be determined without involving an interpolation process. The bitstream may be generated based on the reference template.

In some embodiments, a reference template for a target video block of the video may be determined without involving an interpolation process. The bitstream may be generated based on the reference template. The bitstream may be stored in a non-transitory computer-readable recording medium.

According to embodiments of the present disclosure, the reference template is determined without using the interpolation process. By replacing the interpolation process by different ways described above, the coding complexity may be reduced. In this way, the coding effectiveness and coding efficiency may be improved.

FIG. 11 illustrates a flowchart of a method 1100 for video processing in accordance with some embodiments of the present disclosure. The method 1100 may be implemented during a conversion between a target video block of a video and a bitstream of the video. As shown in FIG. 11, at block 1102, information regarding a candidate list determination process on the target video block is determined based on at least one of: a candidate number threshold (also referred to as maximum allowed candidate number $N_{MAX}$), or a number of available candidates absent from a candidate list (also referred to as $N_{AVAL}$).

Compared with the conventional solution, the proposed method can improve the candidate determination process, and thus improve the coding effectiveness and coding efficiency.

At block 1104, the conversion is performed based on the information. In some embodiments, the conversion may include encoding the target video block into the bitstream. Alternatively, or in addition, the conversion may include decoding the target video block from the bitstream.

In some embodiments, the candidate list determination process may comprise an enhanced motion vector prediction (MVP) list derivation (EMCD), a template matching based merge candidate list construction (TM-MCLC), or any other suitable candidate list determination process.

In some embodiments, the information regarding the candidate list determination process comprises whether to perform the candidate list determination process. Alternatively, or in addition, in some embodiments, the information regarding the candidate list determination process comprises how to perform the candidate list determination process. That is, whether to and/or how to perform EMCD or TM-MCLC may be based on the candidate number threshold (i.e., $N_{MAX}$) and/or available candidate number before being added to a candidate list (i.e., $N_{AVAL}$).

In some embodiments, the available candidates comprise valid candidates used to build the candidate list. In some embodiments, the candidate number threshold indicates a maximum allowed number of candidates in the candidate list. That is, at least $N_{MAX}$ candidates can be included into the ultimate merge list.

In some embodiments, a difference between the candidate number threshold and the number of available candidates absent from the candidate list may be determined. That is, the difference is $N_{AVAL}-N_{MAX}$. If the difference $N_{AVAL}-N_{MAX}$ is larger than a threshold difference (referred to as T), the information is determined to indicate enabling the candidate list determination process. In other words, the EMCD or TM-MCLC is enabled if $N_{AVAL}-N_{MAX}$ is larger than the threshold difference T. In some embodiments, if $N_{AVAL}-N_{MAX}$ is equal to or less than the threshold difference T, the EMCD or TM-MCLC may be disabled. That is, the EMCD or TM-MCLC may be early terminated.

In some embodiments, the threshold difference is a constant. Alternatively, in some embodiments, the threshold difference may be adaptively derived.

In some embodiments, the available candidates may be divided into a plurality of subgroups. For example, the available candidates may be divided into subgroups based on a subgroup candidate threshold number. The subgroup candidate threshold number may be predetermined or adaptively derived. A subgroup in the plurality of subgroups may comprise the subgroup candidate threshold number of candidates. For example, a subgroup of the plurality of subgroups may be determined by adding a subgroup candidate threshold number of candidates from the available candidates into the subgroup. In some embodiments, each subgroup may contain a fixed or adaptively derived number of candidates. Each subgroup may select a fixed number of candidates into the list.

Alternatively, or in addition, in some embodiments, the available candidates may be divided into subgroups based on types of the available candidates. The types of the available candidates may comprise at least one of: a non-adjacent motion vector prediction (MVP), a temporal MVP (TMVP), or a history-based MVP (HMVP). It is to be understood that the above candidate types are only for the purpose of illustration, without suggesting any limitation. Any suitable candidate types may be applied. Scope of the present disclosure is not limited in this regard.

In some embodiments, the candidate list is reordered by reordering candidates in a subgroup of the plurality of subgroups. For example, in the decoder side, only the candidates within a chosen subgroup may be reordered.

In some embodiments, a bitstream of a video may be stored in a non-transitory computer-readable recording medium. The bitstream of the video can be generated by a method performed by a video processing apparatus. According to the method, information regarding a candidate list determination process on a target video block of the video may be determined based on at least one of a candidate number threshold, or a number of available candidates absent from a candidate list. The bitstream may be generated based on the information.

In some embodiments, information regarding a candidate list determination process on a target video block of the video may be determined based on at least one of a candidate number threshold, or a number of available candidates absent from a candidate list. The bitstream may be generated based on the information. The bitstream may be stored in a non-transitory computer-readable recording medium.

According to embodiments of the present disclosure, whether to and/or how to perform the candidate list determination process may be determined. In this way, the candidate determination process can be improved, and thus the coding effectiveness and coding efficiency may be improved.

FIG. 12 illustrates a flowchart of a method 1200 for video processing in accordance with some embodiments of the present disclosure. The method 1200 may be implemented during a conversion between a target video block of a video and a bitstream of the video. As shown in FIG. 12, at block 1202, information associated with a merge candidate of the target video block is determined by a first coding tool. At block 1204, a second coding tool different from the first coding tool is applied on the target video block by using the information.

Compared with the conventional solution, the proposed method can reuse the information determined by a coding tool. By reusing the information determined by the coding tool, a further coding tool does not need to perform repeat calculation to determine the information. In this way, the computation complexity can be reduced, and thus the coding effectiveness and coding efficiency can be improved.

At block 1206, the conversion is performed based on the applying. In some embodiments, the conversion may include encoding the target video block into the bitstream. Alternatively, or in addition, the conversion may include decoding the target video block from the bitstream.

In some embodiments, the first and second coding tools use a template cost of the target video block. For example, a piece of information calculated by the first coding tool utilizing at least one template cost may be reused by the second coding tool utilizing at least one template cost.

In some embodiments, the first coding tool comprises one of the following candidate coding tools: an adaptive reorder of merge candidates (ARMC) coding tool, an enhanced motion vector prediction (MVP) list derivation (EMCD) coding tool, a template matching based merge candidate list construction (TM-MCLC) coding tool, or a further coding tool. The second coding tool may comprise another one of the candidate coding tools.

It is to be understood that the above candidate coding tools are only for the purpose of illustration, without suggesting any limitation. Any suitable coding tool may be applied. Scope of the present disclosure is not limited in this regard.

In some embodiments, the information is stored in a storage shared by the candidate coding tools. For example, the storage may comprise a map, a table, or a further data structure. The storage may be referred to as a unified storage. The unified storage may store the information of each merge candidate.

In some embodiments, the information comprises a template matching cost of the target video block. At block 1202, the first coding tool may determine motion vectors (MVs) associated with the merge candidate. The information may be determined based on the MVs. In some embodiments, at block 1204, the second coding tool may access the storage for the information and use the information.

In some embodiments, the first coding tool may first traverse all the MVs associated with the available candidates and store the corresponding information (including but not limited to template matching cost) in the storage. Then the second coding tool can simply access the needed information from the shared storage without performing repeating calculation.

In some embodiments, a bitstream of a video may be stored in a non-transitory computer-readable recording medium. The bitstream of the video can be generated by a method performed by a video processing apparatus. According to the method, information associated with a merge candidate of a target video block of the video may be determined by a first coding tool. A second coding tool different from the first coding tool may be applied on the target video block by using the information. The bitstream may be generated based on the applying.

In some embodiments, information associated with a merge candidate of a target video block of the video may be determined by a first coding tool. A second coding tool different from the first coding tool may be applied on the target video block by using the information. The bitstream may be generated based on the applying. The bitstream may be stored in a non-transitory computer-readable recording medium.

According to embodiments of the present disclosure, information determined by a coding tool can be reused by a further coding tool. In this way, the coding complexity can be reduced, and thus the coding effectiveness and coding efficiency may be improved.

It is to be understood that the above method 1000, method 1100, method 1200 and/or method 1300 may be used in combination or separately. Any suitable combination of these methods may be applied. Scope of the present disclosure is not limited in this regard.

By using these methods 1000, 1100 and 1200 separately or in combination, coding tools related to template matching can be speedup. The templating matching based video coding can be simplified and improved. In this way, the coding effectiveness and coding efficiency can be improved.

Implementations of the present disclosure can be described in view of the following clauses, the features of which can be combined in any reasonable manner.

Clause 1. A method for video processing, comprising: determining, during a conversion between a target video block of a video and a bitstream of the video, a reference template for the target video block without involving an interpolation process; and performing the conversion based on the reference template.

Clause 2. The method of clause 1, further comprising: determining motion compensation of the target video block by using a tool used in determining the reference template; and determining an inter prediction of the target video block based on the motion compensation.

Clause 3. The method of clause 1 or clause 2, wherein if a motion vector of the target video block points to a fractional position, the reference template is determined without involving the interpolation process.

Clause 4. The method of any of clauses 1-3, wherein determining the reference template comprises: determining the reference template based on an integer precision.

Clause 5. The method of any of clauses 1-4, further comprising: in accordance with a determination that a motion vector of the target video block points to a fractional position, adjusting the motion vector to an integer motion vector.

Clause 6. The method of clause 5, wherein adjusting the motion vector comprises: rounding the fractional position of the motion vector towards zero.

Clause 7. The method of clause 6, wherein: a negative motion vector predictor is rounded towards positive infinity, and a positive motion vector predictor is rounded towards negative infinity.

Clause 8. The method of clause 6 or clause 7, wherein a rounding step used in rounding the fractional position is larger than a threshold.

Clause 9. The method of clause 8, wherein the threshold comprises 1.

Clause 10. The method of clause 1 or clause 2, further comprising: in accordance with a determination that a motion vector of the target video block points to a fractional position, determining the reference template for the target video block by using an interpolation filter different from a further interpolation filter used in a motion compensation process in generating an inter prediction of the target video block.

Clause 11. The method of clause 10, wherein the interpolation filter comprises a simplified interpolation filter.

Clause 12. The method of clause 11, wherein the simplified interpolation filter comprises one of the following: a 2-tap bilinear filter, a 4-tap filter, a 6-tap filter, or an 8-tap filter.

Clause 13. The method of clause 11 or clause 12, wherein the simplified interpolation filter belongs to one of the following interpolation types: a discrete cosine transform (DCT) type, a discrete sine transform (DST) type, a Lanczos type, or a further interpolation type.

Clause 14. The method of clause 10, wherein the interpolation filter comprises a complex interpolation filter.

Clause 15. The method of clause 14, wherein the complex interpolation filter comprises long filter taps.

Clause 16. The method of any of clauses 1-15, further comprising: reordering a plurality of merge candidates of the target video block based on the reference template.

Clause 17. The method of clause 16, wherein the plurality of merge candidates are for template matching merge mode or regular merge mode.

Clause 18. The method of clause 16 or clause 17, wherein reordering the plurality of merge candidates comprises: reordering the plurality of merge candidates by using an integer precision.

Clause 19. The method of clause 16 or clause 17, wherein an integer precision is used in at least one of the following: an adaptive reorder of merge candidates (ARMC), an enhanced motion vector prediction (MVP) list derivation (EMCD), a local illumination compensation (LIC), a template matching based merge candidate list construction (TM-MCLC), or a further coding process.

Clause 20. The method of any of clauses 1-19, further comprising at least one of the following: including information associated with the method in the bitstream; or determining the information associated with the method on-the-fly based on decoded information.

Clause 21. The method of clause 20, wherein the information associated with the method comprises at least one of the following: whether to use the method, or how to use the method.

Clause 22. The method of clause 20 or clause 21, wherein the information associated with the method comprises a usage of an integer precision or a usage of an interpolation filter.

Clause 23. The method of clause 22, further comprising: selecting from the usage of the integer precision and the usage of the interpolation filter based on at least one of: a coding tool of the target video block, or a block dimension of the target video block.

Clause 24. The method of clause 22 or clause 23, wherein the usage of the integer precision is selected for at least one color component.

Clause 25. The method of clause 24, wherein the at least one color component comprises a luma component.

Clause 26. The method of clause 24, wherein the at least one color component comprises three components.

Clause 27. A method for video processing, comprising: determining, during a conversion between a target video block of a video and a bitstream of the video, information regarding a candidate list determination process on the target video block based on at least one of: a candidate number threshold, or a number of available candidates absent from a candidate list; and performing the conversion based on the information.

Clause 28. The method of clause 27, wherein the candidate list determination process comprises one of: an enhanced motion vector prediction (MVP) list derivation (EMCD), or a template matching based merge candidate list construction (TM-MCLC).

Clause 29. The method of clause 27 or clause 28, wherein the information regarding the candidate list determination process comprises at least one of: whether to perform the candidate list determination process, or how to perform the candidate list determination process.

Clause 30. The method of any of clauses 27-29, wherein determining the information comprises: determining a difference between the candidate number threshold and the number of available candidates absent from the candidate list; and in accordance with a determination that the difference is larger than a threshold difference, determining the information to indicate enabling the candidate list determination process.

Clause 31. The method of any of clauses 27-30, wherein the threshold difference is a constant or is adaptively derived.

Clause 32. The method of any of clauses 27-31, wherein the available candidates comprise valid candidates used to build the candidate list.

Clause 33. The method of any of clauses 27-32, wherein the candidate number threshold indicates a maximum allowed number of candidates in the candidate list.

Clause 34. The method of any of clauses 27-33, further comprising: dividing the available candidates into a plurality of subgroups.

Clause 35. The method of clause 34, wherein dividing the available candidates into subgroups comprises: dividing the available candidates into subgroups based on a subgroup candidate threshold number.

Clause 36. The method of clause 35, wherein a subgroup in the plurality of subgroups comprises the subgroup candidate threshold number of candidates.

Clause 37. The method of clause 35 or clause 36, wherein dividing the available candidates based on the subgroup candidate threshold number comprises: determining a subgroup of the plurality of subgroups by adding a subgroup candidate threshold number of candidates from the available candidates into the subgroup.

Clause 38. The method of any of clauses 35-37, wherein the subgroup candidate threshold number is predetermined or adaptively derived.

Clause 39. The method of clause 34, wherein dividing the available candidates into subgroups comprises: dividing the available candidates into subgroups based on types of the available candidates.

Clause 40. The method of clause 39, wherein the types of the available candidates comprise at least one of: a non-adjacent motion vector prediction (MVP), a temporal MVP (TMVP), or a history-based MVP (HMVP).

Clause 41. The method of any of clauses 34-40, further comprising: reordering the candidate list by reordering candidates in a subgroup of the plurality of subgroups.

Clause 42. A method for video processing, comprising: determining, during a conversion between a target video block of a video and a bitstream of the video, information associated with a merge candidate of the target video block by a first coding tool; applying, on the target video block, a second coding tool different from the first coding tool by using the information; and performing the conversion based on the applying.

Clause 43. The method of clause 42, wherein the first and second coding tools use a template cost of the target video block.

Clause 44. The method of clause 42 or clause 43, wherein: the first coding tool comprises one of the following candidate coding tools: an adaptive reorder of merge candidates (ARMC) coding tool, an enhanced motion vector prediction (MVP) list derivation (EMCD) coding tool, a template matching based merge candidate list construction (TM-MCLC) coding tool, or a further coding tool; and the second coding tool comprises another one of the candidate coding tools.

Clause 45. The method of clause 44, further comprising: storing the information in a storage shared by the candidate coding tools.

Clause 46. The method of clause 45, wherein the storage comprises one of the following: a map, a table, or a further data structure.

Clause 47. The method of clause 44 or clause 45, wherein applying the second coding tool by using the information comprises: accessing the storage for the information; and using the information by the second coding tool.

Clause 48. The method of any of clauses 42-47, wherein the information comprises a template matching cost of the target video block.

Clause 49. The method of any of clauses 42-48, wherein determining the information associated with the merge candidate comprises: determining, by the first coding tool, motion vectors (MVs) associated with the merge candidate; and determining the information based on the MVs.

Clause 50. The method of any of clauses 1-49, wherein the method is utilized in at least one of the following: an adaptive reorder of merge candidates (ARMC) coding tool, an enhanced motion vector prediction (MVP) list derivation (EMCD) coding tool, a template matching based merge candidate list construction (TM-MCLC), a template matching motion vector (MV) refinement coding tool, a template matching based candidates reorder for merge with motion vector difference (MMVD) coding tool, an affine motion compensation coding tool, a subblock-based temporal motion vector prediction (SbTMVP), a bilateral matching-based coding tool, or a motion information refinement process.

Clause 51. The method of any of clauses 1-50, wherein the conversion includes encoding the target video block into the bitstream.

Clause 52. The method of any of clauses 1-50, wherein the conversion includes decoding the target video block from the bitstream.

Clause 53. An apparatus for processing video data comprising a processor and a non-transitory memory with instructions thereon, wherein the instructions upon execution by the processor, cause the processor to perform a method in accordance with any of clauses 1-52.

Clause 54. A non-transitory computer-readable storage medium storing instructions that cause a processor to perform a method in accordance with any of clauses 1-52.

Clause 55. A non-transitory computer-readable recording medium storing a bitstream of a video which is generated by a method performed by a video processing apparatus, wherein the method comprises: determining a reference template for a target video block of the video without involving an interpolation process; and generating the bitstream based on the reference template.

Clause 56. A method for storing a bitstream of a video, comprising: determining a reference template for a target video block of the video without involving an interpolation process; and generating the bitstream based on the reference template; and storing the bitstream in a non-transitory computer-readable recording medium.

Clause 57. A non-transitory computer-readable recording medium storing a bitstream of a video which is generated by a method performed by a video processing apparatus, wherein the method comprises: determining information regarding a candidate list determination process on a target video block of the video based on at least one of a candidate number threshold, or a number of available candidates absent from a candidate list; and generating the bitstream based on the information.

Clause 58. A method for storing a bitstream of a video, comprising: determining information regarding a candidate list determination process on a target video block of the video based on at least one of a candidate number threshold, or a number of available candidates absent from a candidate list; generating the bitstream based on the information; and storing the bitstream in a non-transitory computer-readable recording medium.

Clause 59. A non-transitory computer-readable recording medium storing a bitstream of a video which is generated by a method performed by a video processing apparatus, wherein the method comprises: determining, by a first coding tool, information associated with a merge candidate of a target video block of the video; applying, on the target video block, a second coding tool different from the first coding tool by using the information; and generating the bitstream based on the applying.

Clause 60. A method for storing a bitstream of a video, comprising: determining, by a first coding tool, information associated with a merge candidate of a target video block of the video; applying, on the target video block, a second coding tool different from the first coding tool by using the information; generating the bitstream based on the applying; and storing the bitstream in a non-transitory computer-readable recording medium.

Example Device

Figure 13:
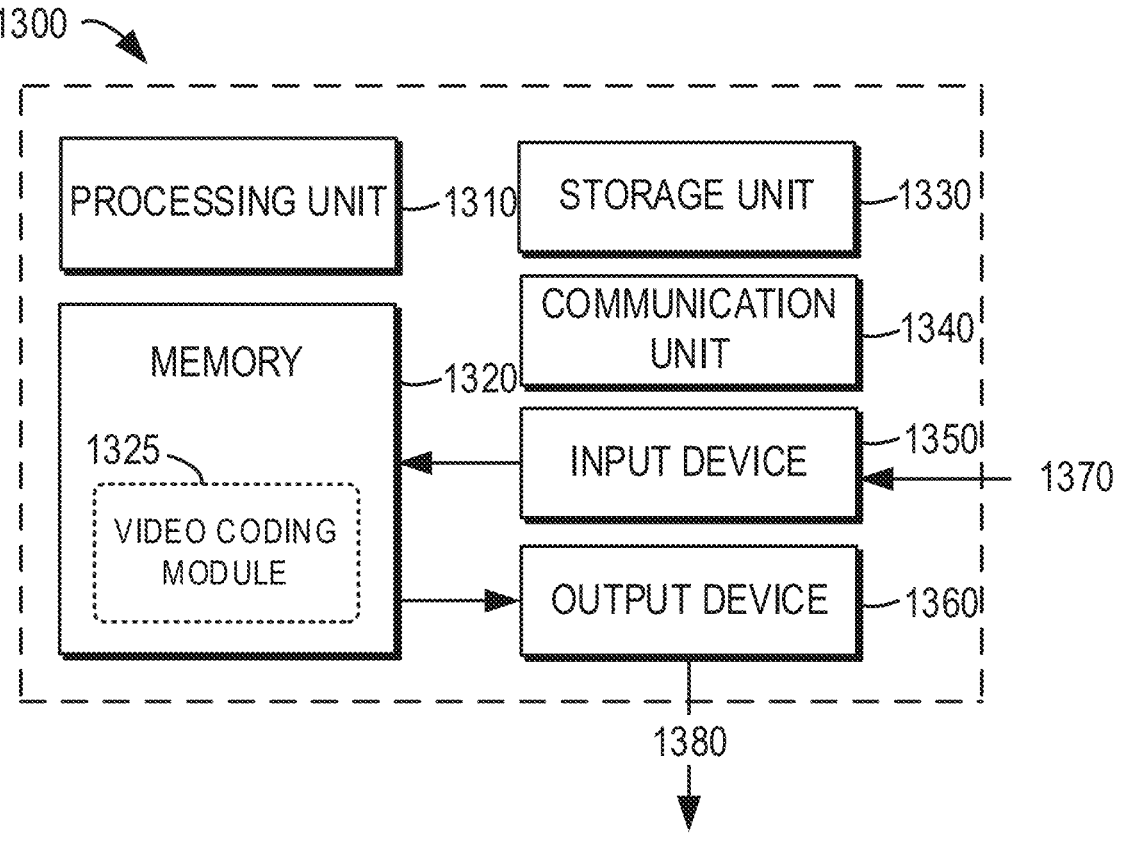
FIG. 13 illustrates a block diagram of a computing device in which various embodiments of the present disclosure can be implemented.

FIG. 13 illustrates a block diagram of a computing device 1300 in which various embodiments of the present disclosure can be implemented. The computing device 1300 may be implemented as or included in the source device 110 (or the video encoder 114 or 200) or the destination device 120 (or the video decoder 124 or 300).

It would be appreciated that the computing device 1300 shown in FIG. 13 is merely for purpose of illustration, without suggesting any limitation to the functions and scopes of the embodiments of the present disclosure in any manner.

As shown in FIG. 13, the computing device 1300 includes a general-purpose computing device 1300. The computing device 1300 may at least comprise one or more processors or processing units 1310, a memory 1320, a storage unit 1330, one or more communication units 1340, one or more input devices 1350, and one or more output devices 1360.

In some embodiments, the computing device 1300 may be implemented as any user terminal or server terminal having the computing capability. The server terminal may be a server, a large-scale computing device or the like that is provided by a service provider. The user terminal may for example be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/ video player, digital camera/video camera, positioning device, television receiver, radio broadcast receiver, E-book device, gaming device, or any combination thereof, including the accessories and peripherals of these devices, or any combination thereof. It would be contemplated that the computing device 1300 can support any type of interface to a user (such as "wearable" circuitry and the like).

The processing unit 1310 may be a physical or virtual processor and can implement various processes based on programs stored in the memory 1320. In a multi-processor system, multiple processing units execute computer executable instructions in parallel so as to improve the parallel processing capability of the computing device 1300. The processing unit 1310 may also be referred to as a central processing unit (CPU), a microprocessor, a controller or a microcontroller.

The computing device 1300 typically includes various computer storage medium. Such medium can be any medium accessible by the computing device 1300, including, but not limited to, volatile and non-volatile medium, or detachable and non-detachable medium. The memory 1320 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage unit 1330 may be any detachable or non-detachable medium and may include a machine-readable medium such as a memory, flash memory drive, magnetic disk or another other media, which can be used for storing information and/or data and can be accessed in the computing device 1300.

The computing device 1300 may further include additional detachable/non-detachable, volatile/non-volatile memory medium. Although not shown in FIG. 13, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 1340 communicates with a further computing device via the communication medium. In addition, the functions of the components in the computing device 1300 can be implemented by a single computing cluster or multiple computing machines that can communicate via communication connections. Therefore, the computing device 1300 can operate in a networked environment using a logical connection with one or more other servers, networked personal computers (PCs) or further general network nodes.

The input device 1350 may be one or more of a variety of input devices, such as a mouse, keyboard, tracking ball, voice-input device, and the like. The output device 1360 may be one or more of a variety of output devices, such as a display, loudspeaker, printer, and the like. By means of the communication unit 1340, the computing device 1300 can further communicate with one or more external devices (not shown) such as the storage devices and display device, with one or more devices enabling the user to interact with the computing device 1300, or any devices (such as a network card, a modem and the like) enabling the computing device 1300 to communicate with one or more other computing devices, if required. Such communication can be performed via input/output (I/O) interfaces (not shown).

In some embodiments, instead of being integrated in a single device, some or all components of the computing device 1300 may also be arranged in cloud computing architecture. In the cloud computing architecture, the components may be provided remotely and work together to implement the functionalities described in the present disclosure. In some embodiments, cloud computing provides computing, software, data access and storage service, which will not require end users to be aware of the physical locations or configurations of the systems or hardware providing these services. In various embodiments, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The computing device 1300 may be used to implement video encoding/decoding in embodiments of the present disclosure. The memory 1320 may include one or more video coding modules 1325 having one or more program instructions. These modules are accessible and executable by the processing unit 1310 to perform the functionalities of the various embodiments described herein.

In the example embodiments of performing video encoding, the input device 1350 may receive video data as an input 1370 to be encoded. The video data may be processed, for example, by the video coding module 1325, to generate an encoded bitstream. The encoded bitstream may be provided via the output device 1360 as an output 1380.

In the example embodiments of performing video decoding, the input device 1350 may receive an encoded bitstream as the input 1370. The encoded bitstream may be processed, for example, by the video coding module 1325, to generate decoded video data. The decoded video data may be provided via the output device 1360 as the output 1380.

While this disclosure has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting.

We claim:

1. A method for video processing, comprising:

determining, during a conversion between a target video block of a video and a bitstream of the video, a reference template for the target video block without involving an interpolation process;

applying a coding tool to the target video block based on the reference template and using an integer precision, wherein the coding tool comprises at least one of: an adaptive reorder of merge candidates (ARMC), an enhanced motion vector prediction (MVP) list derivation (EMCD), a local illumination compensation (LIC), or a template matching based merge candidate list construction (TM-MCLC); and performing the conversion based on the applying.

2. The method of claim 1, further comprising:

determining motion compensation of the target video block by using a tool used in determining the reference template; and determining an inter prediction of the target video block based on the motion compensation, wherein if a motion vector of the target video block points to a fractional position, the reference template is determined without involving the interpolation process, wherein determining the reference template comprises: determining the reference template based on an integer precision.

3. The method of claim 1, further comprising:

in accordance with a determination that a motion vector of the target video block points to a fractional position, adjusting the motion vector to an integer motion vector, wherein adjusting the motion vector comprises:

rounding the fractional position of the motion vector towards zero, wherein a negative motion vector predictor is rounded towards positive infinity, wherein a positive motion vector predictor is rounded towards negative infinity, or wherein a rounding step used in rounding the fractional position is larger than a threshold.

4. The method of claim 1, further comprising:

in accordance with a determination that a motion vector of the target video block points to a fractional position, determining the reference template for the target video block by using an interpolation filter different from a further interpolation filter used in a motion compensation process in generating an inter prediction of the target video block, wherein the interpolation filter comprises a simplified interpolation filter, wherein the simplified interpolation filter comprises one of the following: a 2-tap bilinear filter, a 4-tap filter, a 6-tap filter, or an 8-tap filter, wherein the simplified interpolation filter belongs to one of the following interpolation types: a discrete cosine transform (DCT) type, a discrete sine transform (DST) type, a Lanczos type, or a further interpolation type, or wherein the interpolation filter comprises a complex interpolation filter, wherein the complex interpolation filter comprises long filter taps.

5. The method of claim 1, further comprising:

reordering a plurality of merge candidates of the target video block based on the reference template, wherein the plurality of merge candidates are for template matching merge mode or regular merge mode, wherein reordering the plurality of merge candidates comprises: reordering the plurality of merge candidates by using an integer precision.

6. The method of claim 1, further comprising at least one of:

including information associated with the method in the bitstream; or determining the information associated with the method on-the-fly based on decoded information, wherein the information associated with the method comprises at least one of: whether to use the method, or how to use the method, wherein the information associated with the method comprises a usage of an integer precision or a usage of an interpolation filter.

7. The method of claim 6, further comprising:

selecting from the usage of the integer precision and the usage of the interpolation filter based on at least one of: a coding tool of the target video block, or a block dimension of the target video block, wherein the usage of the integer precision is selected for at least one color component, wherein the at least one color component comprises a luma component, or wherein the at least one color component comprises three components.

8. The method of claim 1, further comprising:

determining information regarding a candidate list determination process on the target video block based on at least one of: a candidate number threshold, or a number of available candidates absent from a candidate list, wherein the candidate list determination process comprises one of: an enhanced motion vector prediction (MVP) list derivation (EMCD), or a template matching based merge candidate list construction (TM-MCLC), wherein the information regarding the candidate list determination process comprises at least one of: whether to perform the candidate list determination process, or how to perform the candidate list determination process, wherein determining the information comprises:

determining a difference between the candidate number threshold and the number of available candidates absent from the candidate list; and in accordance with a determination that the difference is larger than a threshold difference, determining the information to indicate enabling the candidate list determination process.

9. The method of claim 8, wherein the threshold difference is a constant or is adaptively derived, wherein the available candidates comprise valid candidates used to build the candidate list, or wherein the candidate number threshold indicates a maximum allowed number of candidates in the candidate list, wherein the method further comprises dividing the available candidates into a plurality of subgroups.

10. The method of claim 9, wherein dividing the available candidates into subgroups comprises: dividing the available candidates into subgroups based on types of the available candidates, wherein the types of the available candidates comprise at least one of: a non-adjacent motion vector prediction (MVP), a temporal MVP (TMVP), or a history-based MVP (HMVP), or wherein dividing the available candidates into subgroups comprises: dividing the available candidates into subgroups based on a subgroup candidate threshold number, wherein a subgroup in the plurality of subgroups comprises the subgroup candidate threshold number of candidates, wherein dividing the available candidates based on the subgroup candidate threshold number comprises: determining a subgroup of the plurality of subgroups by adding a subgroup candidate threshold number of candidates from the available candidates into the subgroup, wherein the subgroup candidate threshold number is predetermined or adaptively derived, or wherein the method further comprises: reordering the candidate list by reordering candidates in a subgroup of the plurality of subgroups.

11. The method of claim 1, further comprising:

determining information associated with a merge candidate of the target video block by a first coding tool; and applying, on the target video block, a second coding tool different from the first coding tool by using the information associated with the merge candidate.

12. The method of claim 11, wherein the first and second coding tools use a template cost of the target video block, or wherein the first coding tool comprises one of the following candidate coding tools: an adaptive reorder of merge candidates (ARMC) coding tool, an enhanced motion vector prediction (MVP) list derivation (EMCD) coding tool, a template matching based merge candidate list construction (TM-MCLC) coding tool, or a further coding tool; and the second coding tool comprises another one of the candidate coding tools.

13. The method of claim 12, further comprising: storing the information associated with the merge candidate in a storage shared by the candidate coding tools, wherein the storage comprises one of: a map, a table, or a further data structure, wherein applying the second coding tool by using the information comprises:

accessing the storage for the information; and using the information by the second coding tool.

14. The method of claim 11, wherein the information associated with the merge candidate comprises a template matching cost of the target video block, or wherein determining the information associated with the merge candidate comprises:

determining, by the first coding tool, motion vectors (MVs) associated with the merge candidate; and determining the information based on the MVs.

15. The method of claim 1, wherein the method is utilized in at least one of:

an adaptive reorder of merge candidates (ARMC) coding tool, an enhanced motion vector prediction (MVP) list derivation (EMCD) coding tool, a template matching based merge candidate list construction (TM-MCLC), a template matching motion vector (MV) refinement coding tool, a template matching based candidates reorder for merge with motion vector difference (MMVD) coding tool, an affine motion compensation coding tool, a subblock-based temporal motion vector prediction (SbTMVP), a bilateral matching-based coding tool, or a motion information refinement process.

16. The method of claim 1, wherein the conversion includes encoding the target video block into the bitstream.

17. The method of claim 1, wherein the conversion includes decoding the target video block from the bitstream.

18. An apparatus for processing video data comprising a processor and a non-transitory memory with instructions thereon, wherein the instructions upon execution by the processor, cause the processor to:

determine, during a conversion between a target video block of a video and a bitstream of the video, a reference template for the target video block without involving an interpolation process;

applying a coding tool to the target video block based on the reference template and using an integer precision, wherein the coding tool comprises at least one of: an adaptive reorder of merge candidates (ARMC), an enhanced motion vector prediction (MVP) list derivation (EMCD), a local illumination compensation (LIC), or a template matching based merge candidate list construction (TM-MCLC); and perform the conversion based on the applying.

19. A non-transitory computer-readable storage medium storing instructions that cause a processor to perform a method performed by a video processing apparatus, wherein the method comprises:

determining, during a conversion between a target video block of a video and a bitstream of the video, a reference template for the target video block without involving an interpolation process;

applying a coding tool to the target video block based on the reference template and using an integer precision, wherein the coding tool comprises at least one of an adaptive reorder of merge candidates (ARMC), an enhanced motion vector prediction (MVP) list derivation (EMCD), a local illumination compensation (LIC), or a template matching based merge candidate list construction (TM-MCLC); and performing the conversion based on the applying.

* * * * *